Jan. 5, 1943.  H. R. SCHUTZ ET AL  2,307,425
APPARATUS FOR MANUFACTURING GLASSWARE
Filed June 3, 1939  8 Sheets-Sheet 1

H. R. Schutz and
C. R. Vining
INVENTORS.

BY Rule & Hoge
ATTORNEYS.

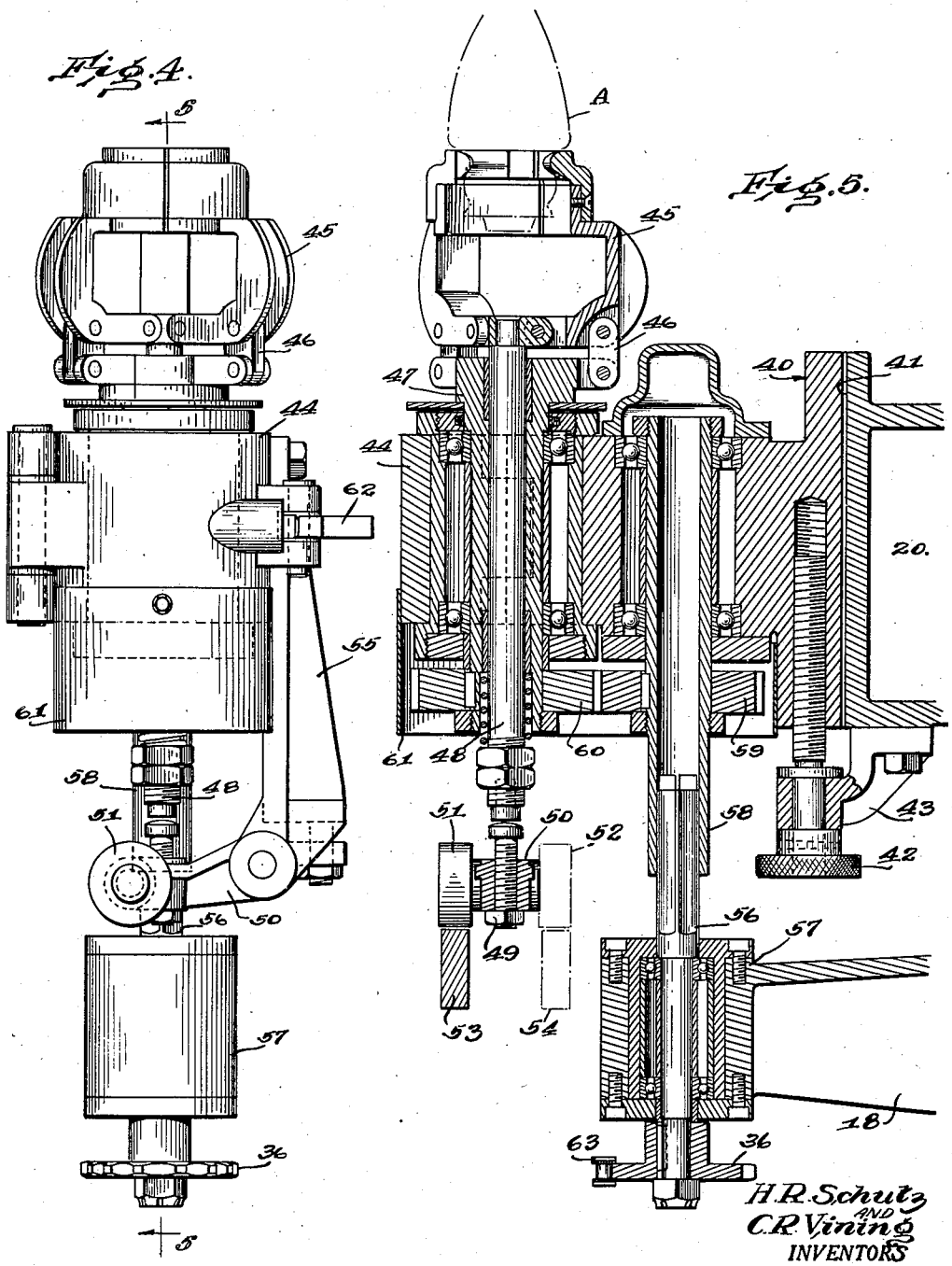

Jan. 5, 1943.   H. R. SCHUTZ ET AL   2,307,425
APPARATUS FOR MANUFACTURING GLASSWARE
Filed June 3, 1939   8 Sheets-Sheet 5

H. R. Schutz and
C. R. Vining
INVENTORS

BY Rule & Hoge
ATTORNEYS.

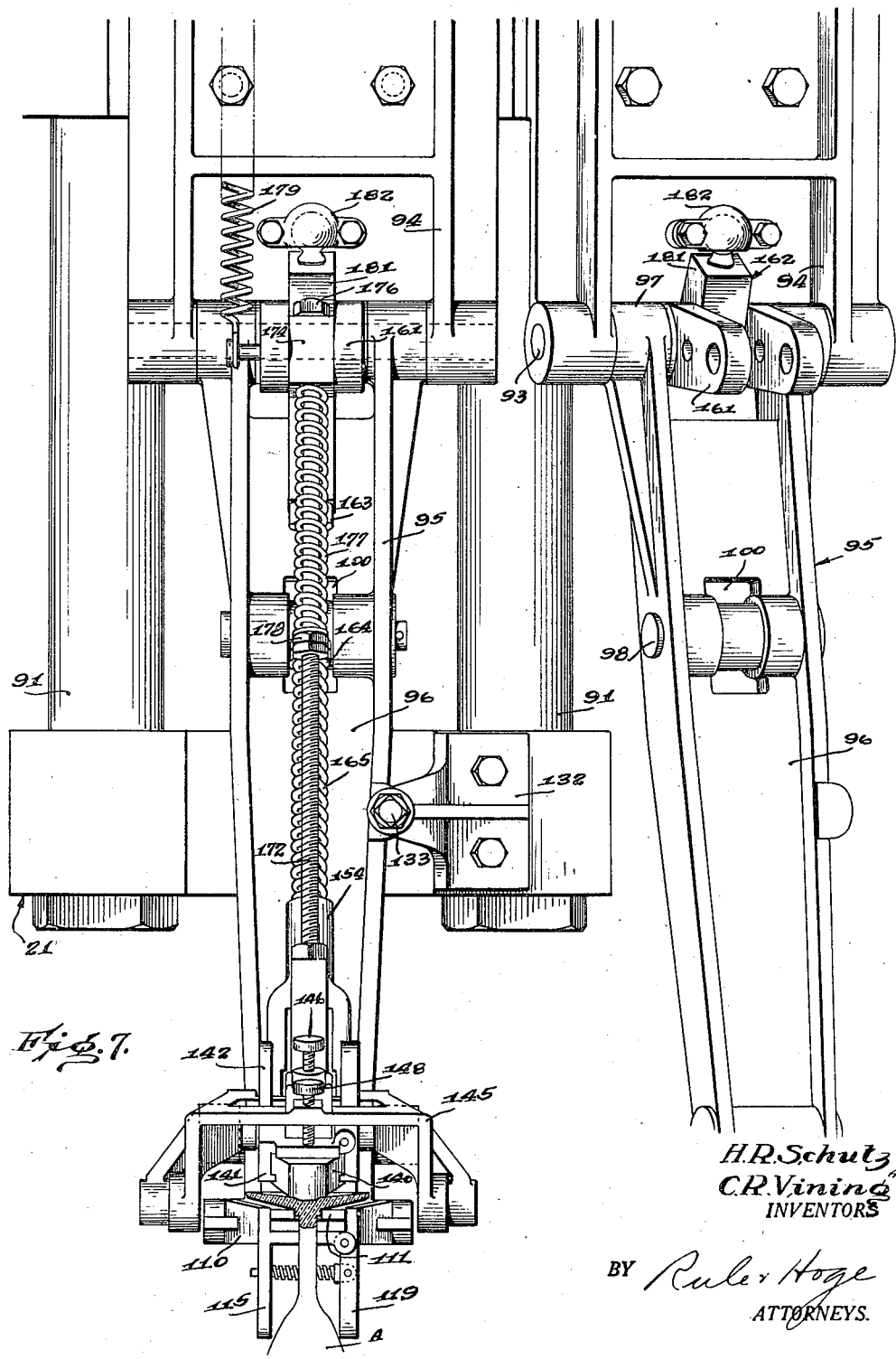

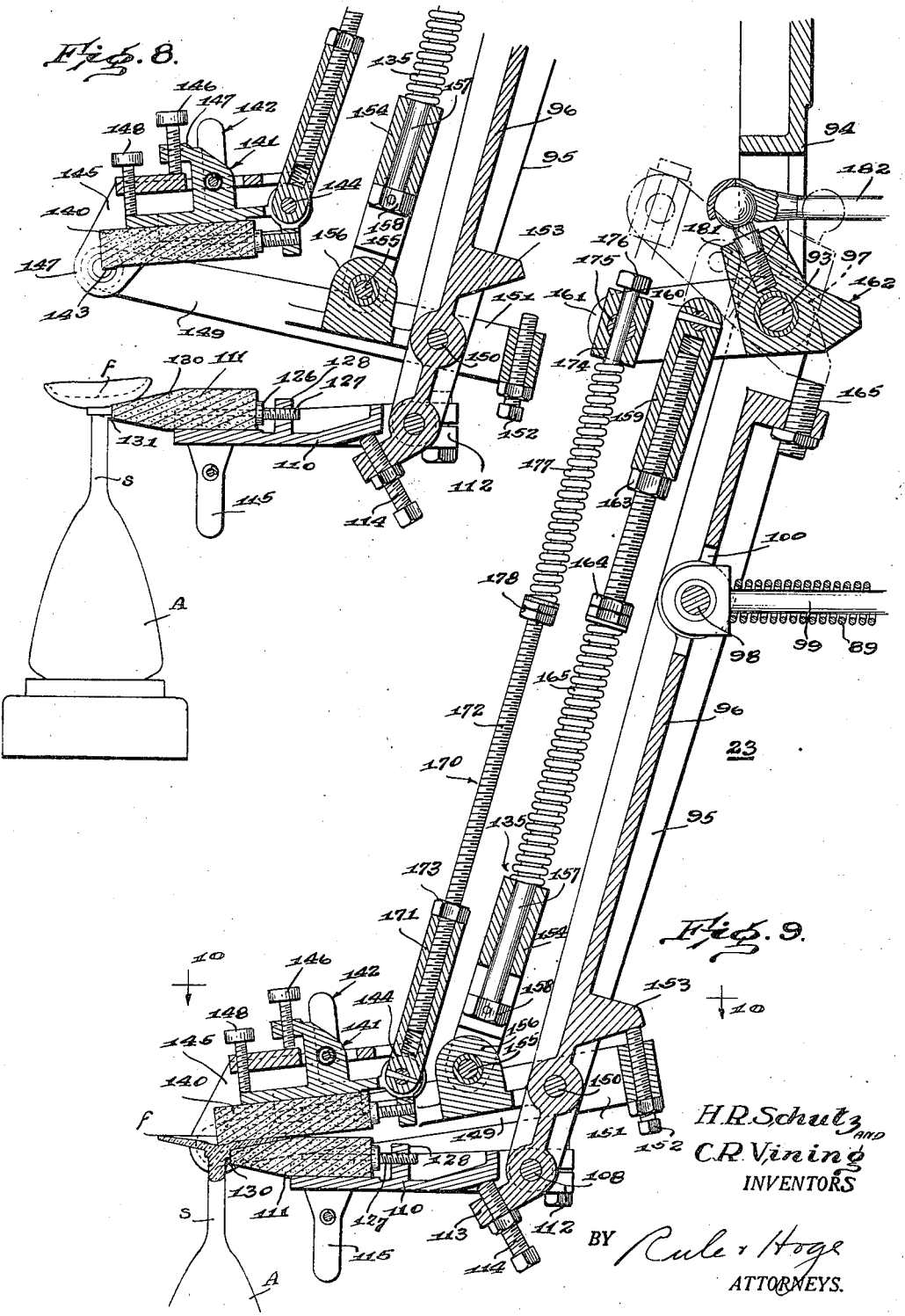

H. R. Schutz and C. R. Vining
INVENTORS

BY Rule & Hoge
ATTORNEYS.

Patented Jan. 5, 1943

2,307,425

UNITED STATES PATENT OFFICE 2,307,425

APPARATUS FOR MANUFACTURING GLASSWARE

Harold R. Schutz, Toledo, and Charles R. Vining, Elmore, Ohio, assignors to Libbey Glass Company, a corporation of Ohio Application June 3, 1939, Serial No. 277,228

5 Claims. (Cl. 49—27)

The present invention relates to improvements in apparatus for manufacturing glassware and is particularly concerned with the flaring or substantially flattening of glass articles or portions thereof such for example, as the feet of tumblers which in the initial stage of manufacture are more or less of concavo-convex form and when finally shaped are relatively flat.

Another object is the provision of novel apparatus which, in operating upon an article of stemware, at all times supports the article in such position as to minimize any tendency toward distortion.

A further object is the provision of a novel and unusually efficient foot forming or shaping tool which is conducive to improved quality and uniformity in the finished articles as well as increased production.

A still further object is the provision of a continuously rotating machine wherein the tumblers, the feet of which are being subjected to a final shaping, are supported in an inverted position whereby to reduce, if not entirely eliminate, any tendency of the stem portions to bend or become otherwise distorted and to take advantage of the force of gravity in the reshaping of the foot portions.

Other objects will be in part apparent and in part pointed out hereinafter.

In the drawings:

Fig. 4 is a front elevational view of one of the chuck units.

Fig. 5 is a vertical sectional view taken substantially along the line 5—5 of Fig. 4.

Fig. 7 is a front elevational view of the foot reshaping or forming unit.

Fig. 8 is a fragmentary sectional view of the foot former in its position of initial engagement with the foot of a tumbler.

Fig. 9 is an enlarged sectional view of the foot former in its final operative position.

Figure 1:
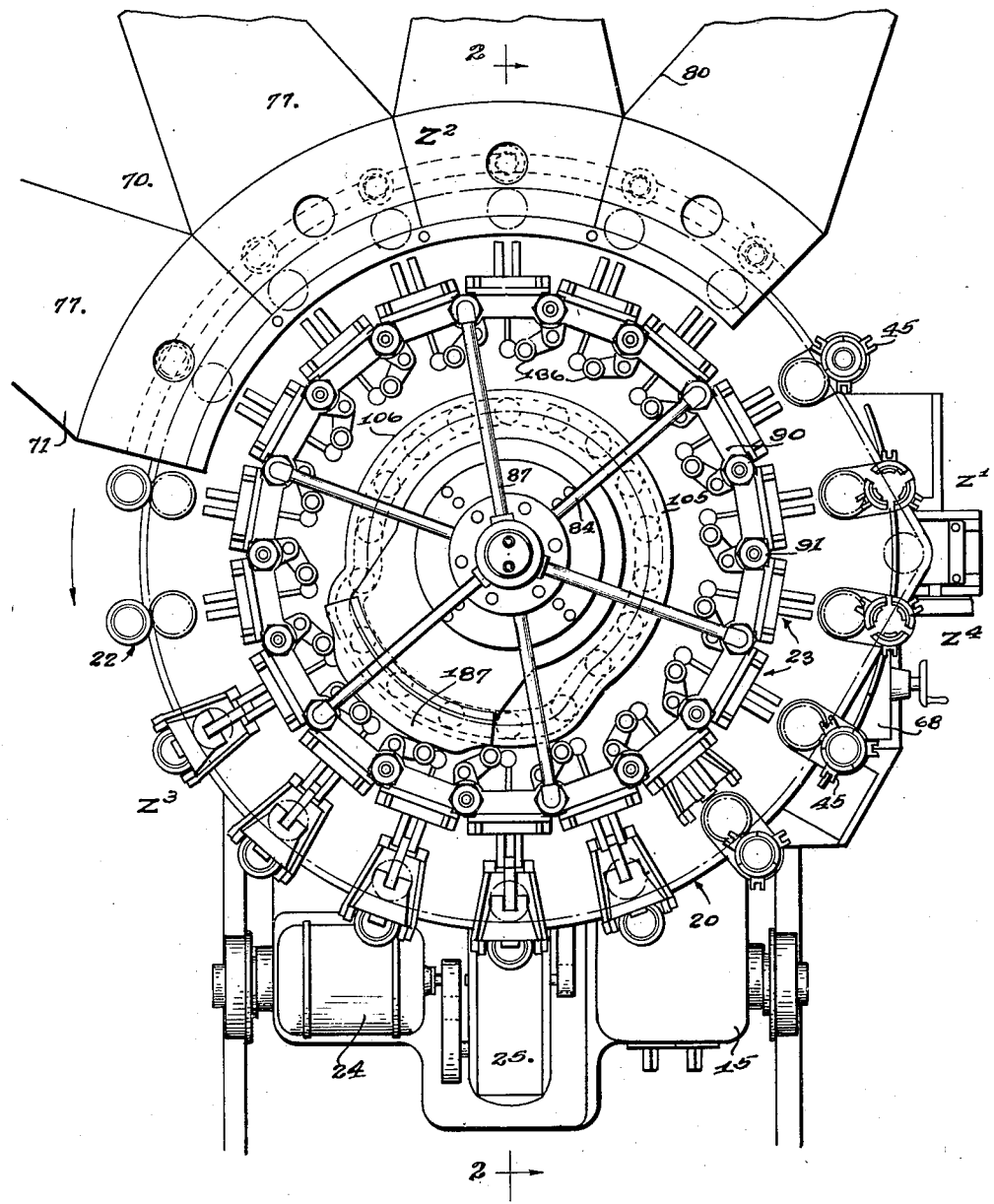
Fig. 1 is a top plan view of a machine embodying our invention.

Our invention is illustrated in a rotary type of machine (Fig. 2) which may well include a wheeled base 15, a central column 16 rising vertically therefrom and a rotary carriage 17 supported upon said base and rotatable about the column for the purpose of moving a series of tumbler supporting and foot reshaping units past loading, foot reheating, foot shaping and unloading or takeout zones $Z^1$, $Z^2$, $Z^3$, and $Z^4$ respectively.

The carriage 17 consists of a lower spider 18 rotatively resting upon the base, a cylinder 19 rising therefrom and surrounding the central column 16, an intermediate spider 20, and an upper spider 21. The intermediate spider 20 carries the tumbler supports 22 or chuck units, and the upper spider supports the foot shaping or forming units 23. Rotation of the carriage is obtained by means of an electric motor 24 from which motion is transmitted to the carriage through means including a speed reducer 25, a pinion 26 and a ring gear 27, the latter being carried by the lower spider.

The intermediate spider 20 is mounted for vertical adjustment upon the cylinder 19 so that the spaced relationship between the chuck units 22 and foot forming units 23 may be changed with ease and facility. Toward this end, the spider 20 rides upon an antifriction bearing 28 which is positioned between said spider and a flange 29, the latter provided at the lower end of a collar 30 which is threaded upon the cylinder 19. A collar 31 which is rigidly secured to the upper side of the spider, has a spline connection with the cylinder 19. Thus rotation of the collar 30 which is threaded upon the cylinder, will move the spider vertically while the spline prevents relative rotation of the spider and cylinder. A ring gear 32 attached to the lower side of the flange and a meshing pinion 33 carried by a manually operable shaft 34, provide means for adjusting the position of the spider. Such adjustment is relatively coarse and ordinarily is followed by a fine adjustment of the individual chuck units 22 for final positioning thereof.

Each chuck unit 22 (Figs. 1, 4 and 5) includes a casting 40 which is slidable vertically in a guideway 41 provided on the intermediate spider 20 and which is capable of a relatively fine manual adjustment vertically by means of an adjusting screw 42 threadedly received in the casting and rotatably held in a bracket 43 secured to the spider 20. The adjusting screw 42 constitutes the means previously referred to for final positioning of the chuck unit after the collective coarse adjustment of all the units by means of the shaft 34. A hinged plate 44 cooperates with the casting in supporting a rotary chuck assembly including conventional chuck jaws 45, which are pivoted by means of links 46 to a rotary sleeve 47 through which there extends a push rod 48, the lower end of which is adapted to be engaged by a lifting stud 49 carried at the free end of a pivoted link assembly 50 which rides by means of cam rollers 51 and 52 on one or the other of a pair of cam tracks 53 and 54 and which has pivotal connection with a bracket 55 secured to the casting 40. Obviously, movement of the lifting stud 49 upwardly will cause a corresponding movement of the push rod 48 and a consequent opening of the normally closed chuck jaws 45. Rotation of the chuck jaws 45 is obtained by means of a driving connection leading from a sprocket wheel 36 mounted on a shaft 56 journalled in a hub 57 formed on the periphery of the spider 18 and having a spline connection with a tubular shaft 58 journalled in the casting 40. A gear 59 keyed to the shaft 58 meshes with a gear 60 keyed to the sleeve 47, thus completing the driving connection between the sprocket wheel 36 and the rotating chuck assembly. A guard 61 consisting of two pieces is secured to the casting 40 and plate 44 and conceals the gears 59 and 60. The plate 44 is provided with a latch 62 which, when released, permits the plate to be swung to an open position for removal or replacement of the chuck assembly as a unit. This permits chuck jaws of different sizes and shapes to accommodate a variety of glass articles to be substituted for one another in the machine.

Figure 3:
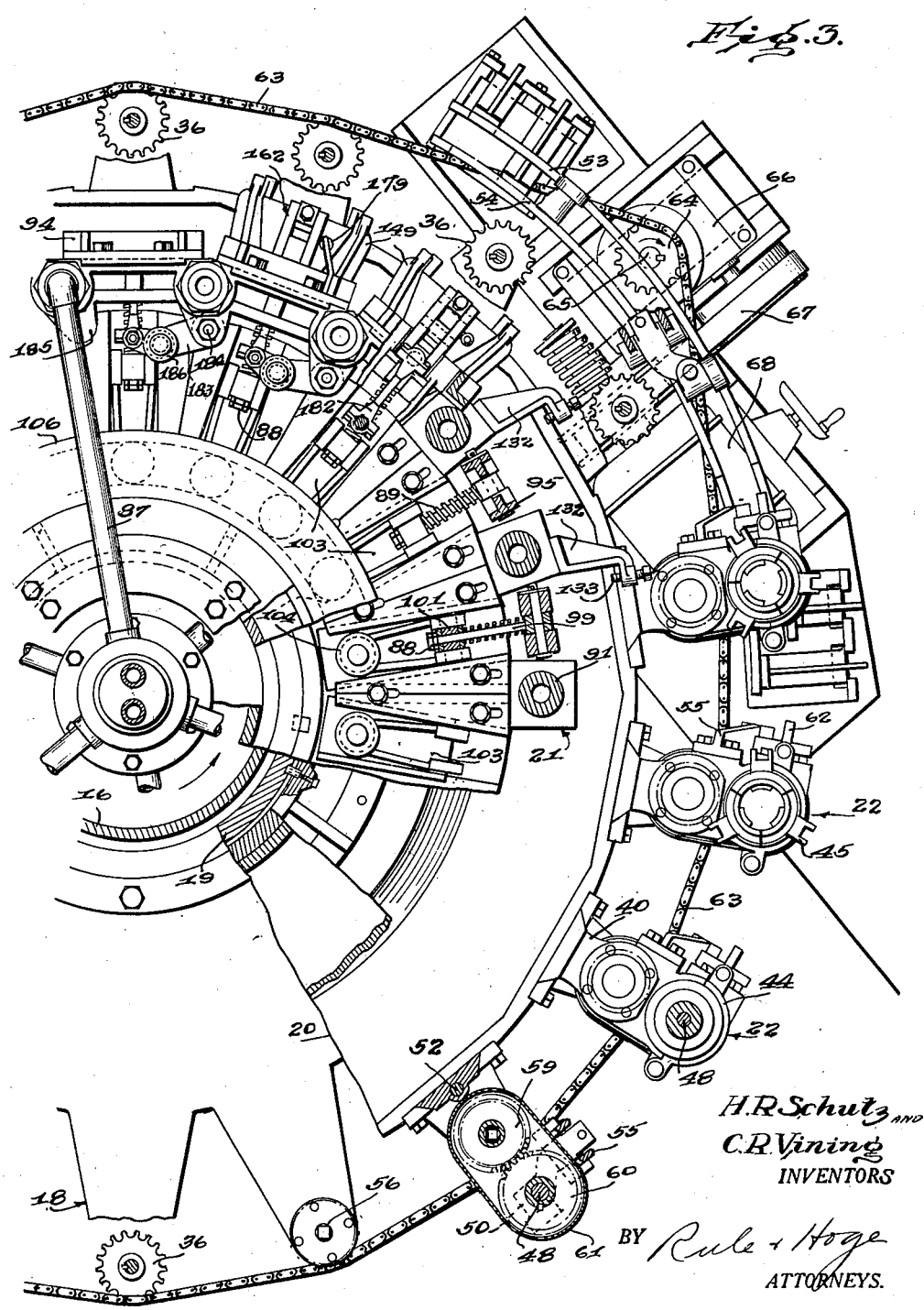
Fig. 3 is a fragmentary sectional top plan view wherein the sections are cut at different elevations on the successive heads or units of the machine to illustrate the specific details thereof.

Referring now to Figs. 3 and 5, an endless chain 63 is trained over all of the sprocket wheels 36 and is adapted to be itself driven counter to the direction of rotation of the machine. Accordingly, a driving sprocket 64, mounted on a shaft 65 which is connected through a gear box 66 and variable speed transmission device 67 to an electric motor 68, meshes with the endless chain 63 and serves to drive the same continuously. Thus it will be seen that by the above arrangement of the driving connections for the various chuck assemblies, the speed of rotation of the latter may regulably be controlled independent of the speed of rotation of the machine.

Figure 2:
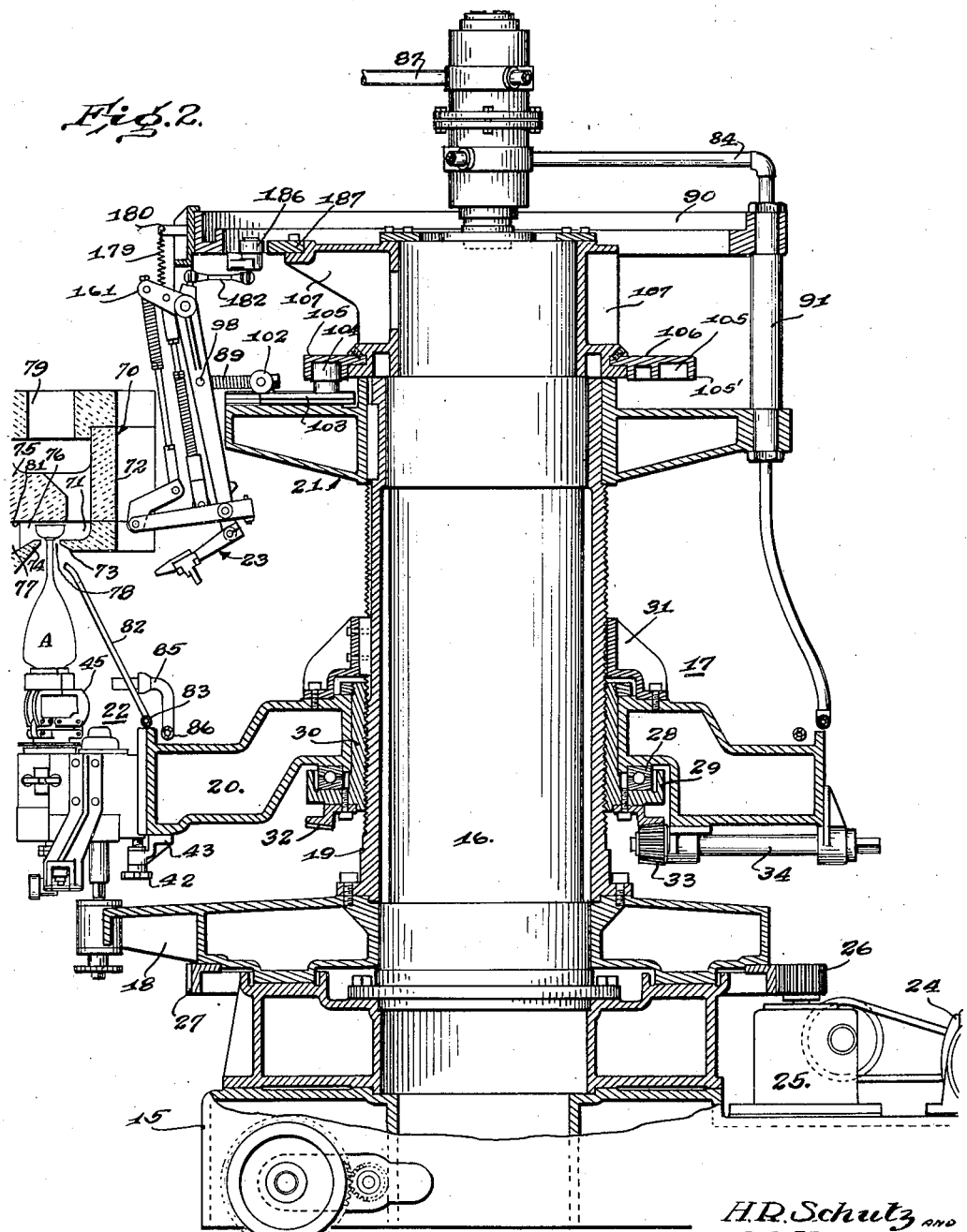
Fig. 2 is a sectional elevational view taken substantially along the line 2—2 of Fig. 1.

Referring now to Figs. 1 and 2, the foot reheating furnace 70 includes an arcuate horizontal chamber 71 having an outer wall 72 provided with an inwardly directed flange 73 at its lower end, which constitutes a portion of the bottom wall of the furnace. A series of blocks 74, in cooperation with a series of exhaust stack blocks 75, forms ports 76 through which the chamber 71 communicates with a series of combustion chambers 77. The blocks 74 are spaced horizontally from the flange 73 for the purpose of producing an arcuate bottom slot or downwardly facing opening 78 through which the stems $s$ of the articles project and move during the reheating of the foot portions $f$ thereof. The blocks 74 constitute a portion of the bottoms of the chambers 71 and the upwardly slanting surfaces thereof direct the burning products of combustion into the chambers 71 in a more or less sheet-like form. The products of combustion are introduced into the combustion chambers 77 by constantly lighted burners (not shown) and, after passing across the arcuate chamber 71, are expelled through a series of openings 79 at the top of the furnace.

Each combustion chamber 77 is so formed that its side walls 80 (Fig. 1) taper outwardly toward the corresponding arcuate chamber 71. As a result of this formation of the individual chambers 77 and of their closely spaced relationship, the entire space in the chamber 71 is completely filled with the burning products of combustion. The upper wall 81 of the chamber 71, closely overlies the foot portions $f$ of the articles undergoing treatment, and, as a consequence, the exterior surfaces of these foot portions are subjected directly to the reheating flame, while the interior concave portions thereof are largely reheated by reflection and radiation from the upper wall 81.

The temperature attained in the chamber 77 is ordinarily sufficiently high to definitely soften the glass of the foot portions $f$. The stems $s$ of the articles are cooled during the reheating operation on the foot portions $f$ by means of air jets 82 supplied from a circular manifold 83 that in turn is supplied by means of radially extending pipes 84 leading from a common source of compressed air. Such artificial cooling prevents softening of the stems and consequent collapse thereof under the weight of the foot portions. Inasmuch as the temperature necessarily is sufficiently high to effect a softening of the glass foot portions $f$, these portions will, after becoming fully heated, be affected by the pull of gravity thereon in such a manner that their upwardly facing concavo-convex shape will tend to at least partially flatten out and approach a more or less irregular or uneven flat disk-like form as shown in Fig. 8 preparatory to the reshaping operation. Furthermore, because of the fact that the stems $s$ of the articles are in an upright position while passing through the reheating chamber 71, the complete absence of lateral gravitational forces on the stems, combined with the appreciable gyroscopic tendency of the stems to remain upright, materially reduces the tendency of the same to get out of line in their respective articles, to bend or otherwise become distorted.

Referring now to Fig. 2, in order to maintain the chuck jaws 45 at a relatively high temperature, approximating the temperature of the rim portions of the glass articles undergoing treatment and thereby prevent checking or otherwise marring the surface of the glass in contact therewith, a series of flame-producing jets 85 is directed toward the jaws 45 and is supplied from a circular manifold 86 which is in turn supplied from a series of radially extending pipes 87 leading from a common source of combustible gas.

Referring now to Figs. 2 and 7 to 12 inclusive, an upper ring member 90 is supported by means of spacing members 91 from the upper spider 21 and is concentric with the axis of the machine. The ring member 90 together with the upper spider 21 have associated therewith a series of flaring, reshaping, or foot-forming units 23, each of which is individual to one of the chuck units 22 and is designed for flaring or shaping the reheated foot member $f$ of the article supported in the unit.

Each flaring or reshaping mechanism 23 is suspended from the ring member 90 in such a manner that it may be swung from the inoperative position shown in Fig. 2 to the operative positions shown in Figs. 7, 8 and 9. Referring now to Figs. 7 and 9, each mechanism 23 is pivotally suspended from a cross-shaft 93 that extends across the lower end of a bifurcated hanger 94 mounted on the ring member 90, and includes an arm 95 which is generally in the form of an I-beam, or which is channel-like in its construction. The side portions of the arm 95 are connected together by a web 96, and a pair of bosses 97 at the upper ends of the side portions provides the pivotal connection with the shaft 93 by means of which the forming unit as a whole is suspended. A rod 98 (Figs. 2, 7 and 9) extends across the side portions of the arm 95 in the plane of the web 96 and has secured thereto within an opening 100 in said web, one end of an actuating link 99. The other end of the link 99 extends through a shaft 101 (Fig. 3) journalled in bearings 102 at the outer end of a slide 103. A stop nut 88 (Fig. 3) is associated with the inner end of the link 99, and a spring 89 surrounding the link 99, normally urges the arm 95 outwardly to the extent permitted by the position of the stop nut 88. A cam roller 104 (Figs. 2 and 3) mounted on the inner end of the slide, rides in a continuous cam groove 105 provided in a cam ring 106 secured to a stationary annular bracket 107 mounted on the upper end of the column 16. The cam ring 106 is so designed that an offset portion 105' of the groove 105 in the vicinity of the reshaping zone $Z^3$ possesses a greater degree of eccentricity than the remainder of the groove and thus, as the machine rotates and the cam roller 104 moves into the offset portion 105', the foot-forming units 23 will be swung outwardly as the units approach the reshaping zone $Z^3$ and will be retracted as they leave this zone.

Figure 11:
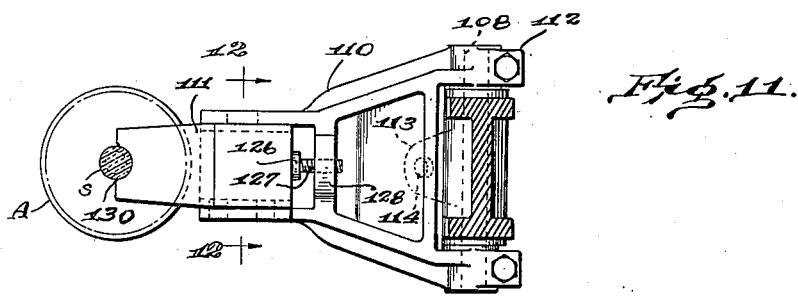
Fig. 11 is a sectional plan view of the backing tool which is the lower member of the foot forming unit.
Figure 12:
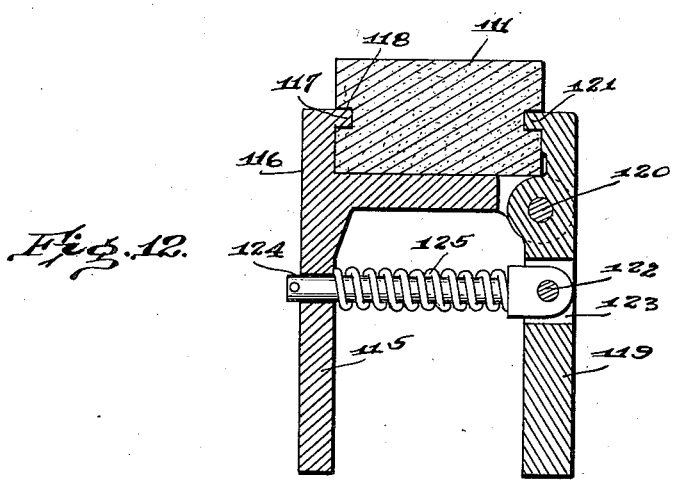
Fig. 12 is a sectional view taken substantially along the line 12—12 of Fig. 11.

Referring to Figs. 9 and 11, a shaft 108 extending across the sides of the arm 95 at the extreme lower end thereof, projects outwardly at each end and, in effect, provides trunnions to which is pivotally secured a support 110 or holder for a backing tool 111. The holder 110 is generally of tapered configuration and the inner end thereof is formed with a pair of outwardly projecting clamping bosses 112 by means of which the holder is secured to the trunnions provided by the shaft 108. An ear 113, formed on the extreme lower end of the arm 95, centrally thereof, carries an adjusting screw 114 that engages the lower side of the holder near the rear edge thereof and facilitates adjustment of the inclination of the holder when the clamping bosses 112 are loosened.

The holder 110 (Figs. 7, 8, 9 and 12) is formed adjacent its outer end and at one side with a depending leg 115. A flange 116 extends upwardly from the side of the holder and forms in effect a continuation of the leg 115. The upper end of the flange 115 has an inwardly directed rib 117 to form a guide rail which extends into one of a pair of grooves 118 formed longitudinally in the opposite sides of the backing tool 111. A second leg 119, simulating in appearance the leg 115 and its extension flange 116, is pivoted to a pintle 120 for tilting movement toward and away from the leg 115 and is provided with an inturned guide rail 121 or rib, corresponding and opposed to the guide rail 117. The guide rail 121 extends into the other groove 118 in the backing tool 111. A shaft 122 extends across an opening 123 in the leg 119 and a rod 124 is pivoted to the shaft 122 and passes through the leg 115. A coil spring 125 surrounding the rod 124, serves to spread the legs 115 and 119 apart and thus cause the backing tool 111 to be firmly clamped between the two inwardly extending guide rails 117 and 121. The underneath side of the backing tool 111 engages and is supported on the upper surface of the holder 110 and shifting of the tool inwardly of the holder is prevented by an abutment 126 or head formed on a screw 127 which is threaded through an ear 128 provided on the holder.

The backing tool 111 is preferably formed of pressed carbon although other materials have been found to be satisfactory. The tool 111 is relatively narrow and the forward end thereof is uniformly tapered on opposite sides to provide foot-engaging surfaces 130 that may interchangeably be employed by inverting the tool in the holder 111. A semi-circular recess 131 is formed in the forward edge of the tool to receive the stems $s$ of the articles during shaping of the foot portions $f$.

While the extent of movement of the slide 103 (Fig. 2) will roughly determine the extent of outward movement of the foot-forming unit 23, a means for more accurately determining the outermost position of the unit is found to be necessary in order to prevent the backing tool 111 from overstepping its mark, so to speak, and engaging the relatively fragile stems $s$ so forcibly as to rupture them. Accordingly, a bracket 132 (Fig. 7) is secured to the upper spider 21 and extends outwardly and around the forward edge of one of the sides of the arm 95. An inwardly directed adjusting screw 133 provides a limit stop which is designed for engagement with the side of the arm 95 when the latter is swung to its outermost position. The throw of the slide 103 is slightly in excess of that required to bring the side of the arm 95 into engagement with the limit stop 133 and thus, when such engagement is effected, the link 99 will slide in the shaft 101 and the spring 89 will be compressed to maintain the arm 95 firmly in engagement with the limit stop, thus establishing a definite position for the entire forming unit 23.

Figure 10:
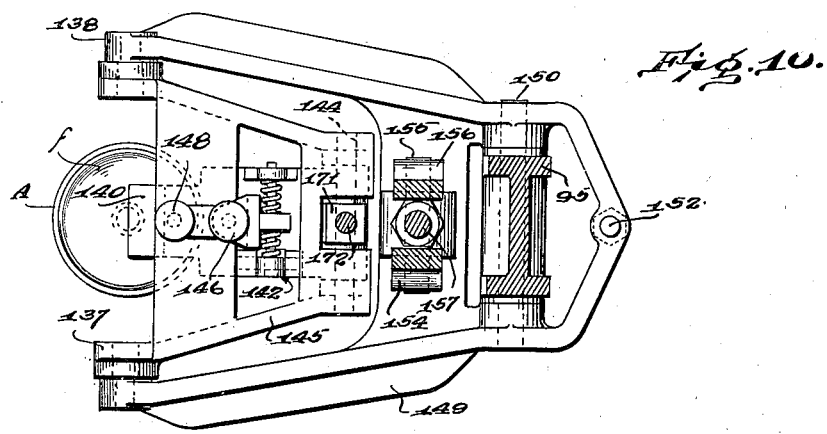
Fig. 10 is a sectional plan view taken substantially along the line 10—10 of Fig. 9.

Referring now to Figs. 8, 9 and 10, the backing tool 111 which, in the outermost position of the arm 95, is adapted to underlie the foot portion $f$ of the article, as shown in Figs. 8 and 9, is designed for cooperation with a flaring tool 140 likewise preferably formed of pressed carbon and similarly supported in a holder 141, a clamping mechanism 142, similar to the leg and spring arrangement 115, 116, etc., being employed for the purpose. The flaring tool 140 is also of tapered form (Fig. 7) and the underneath surface thereof is substantially flat except for the provision of a small protuberance 143 (Fig. 8) at the forward edge thereof which is adapted to extend into a depression or hollow ordinarily occurring centrally on the underneath side of the foot portion $f$ as will be set forth later.

The rear end of the holder 141 for the flaring tool 140 is bifurcated and a shaft 144, extending across the furcations thereof, projects outwardly at each side to provide in effect trunnions, to which is pivotally connected a holder bracket 145. The holder 141 is adapted to be securely clamped to the bracket 145 while at the same time provision is made for adjusting the inclination of the holder relative to the bracket. Toward this end, a set screw 146 (Fig. 8) extends through a lug 147 on the holder that overlies a portion of the bracket 145 and bears against the latter while at the same time a second set screw 148 passes through a portion of the bracket overlying the holder and bears against the latter. The holder is thus firmly clamped to the bracket against tilting with respect thereto. By backing up on the set screw 146 and tightening the set screw 148 and vice versa, it is obvious that the inclination of the holder 141 relative to the bracket 145 may be adjusted. When in any desired position of adjustment, however, the holder 141 and its bracket 145 in effect form a single rigid unit in a linkage system as will presently appear.

The holder bracket 145 (Figs. 8, 9 and 10) is formed with a pair of ears 147 to which are pivoted similar ears 138 formed at the end of a foot-piece 149. A shaft 150 extends across the sides of the arm 95 just above the shaft 108 and projects outwardly therefrom at opposite ends, to provide in effect, trunnions to which the rear end of the foot-piece 149 is pivoted. An inner extension 151 formed on the foot-piece 149 carries a set screw 152 which engages a lug 153 formed in the web portion 96 of the arm 95 and determines the limit of downward swinging movement of the foot-piece relative to the arm 95.

The foot-piece 149 is pivotally connected medially thereof and forwardly of the arm 95 to a link assembly 135 which is yieldable when compressive force is applied thereto. The link assembly 135 includes a sleeve 154, the lower end of which is bifurcated and pivotally secured to a shaft 155 that extends across a pair of ears 156 formed on the foot-piece 149. An elongated rod 157 slidably extends through the sleeve 154 and is provided with a head 158 between the furcations of the sleeve 154. The rod 157 is threadedly received in a socket member 159 which is pivotally suspended at its upper end from a shaft 160 that extends across a pair of parallel arms 161 (Figs. 7 and 9) formed on an actuating lever 162 that operates on the bell-crank lever principle and which is mounted for rocking movement on the shaft 93. A lock-nut 163 on the threaded portion of the rod 157 anchors the rod to the socket member 159 and may be loosened when the effective length of the entire link assembly is to be altered. Cooperating lock-nuts 164 provide an abutment for one end of a coil spring 165 surrounding the rod 157, the other end of the spring bearing against the sleeve 154.

The flaring tool holder 141 is pivotally connected at its inner or rear end to a link assembly 170 which, like the link assembly 135 is yieldable longitudinally when compressive force is applied thereto. The specific connection consists of a socket member 171 similar to the member 159 which is pivoted at its lower end to the shaft 144 and which threadedly receives therein the lower end of a rod 172, the latter being clamped thereto by means of a locking nut 173. The upper end of the rod 172 passes through a swivel block 174 mounted on a shaft 175 extending across the arms 161 of the actuating lever 162 outwardly of the shaft 160. The rod 172 is provided with a head 176 at its upper end designed for engagement with the swivel block 174. A coil spring 177 surrounding the rod 172 bears at one end against a pair of lock-nuts 178 and at the other end against the swivel block 174.

The actuating lever 162 is normally held in its uppermost position by means of a spring 179 (Figs. 2 and 7) connecting one of the arms 161 to a bracket 180 secured to the ring member 90. The rear end of the lever 162 bears against an adjustable limit stop 165 when the lever is elevated as shown in dotted lines in Fig. 9.

An arm 181 (Figs. 7 and 9) is formed on the actuating lever 162 and extends outwardly at an angle from the parallel arms 161 and has a ball and socket connection with a connecting rod 182 (Figs. 2, 3 and 9) that also has a ball and socket connection with a lever 183 pivoted as at 184 to an ear 185 formed on the ring member 90. A cam roller 186 mounted on the lever 183 medially thereof, is designed for engagement with a cam rail 187 (Figs. 1 and 2) mounted on the annular bracket 107 and situated in the region of the reshaping zone $Z^3$. Thus, as the machine rotates and the cam roller 186 engages the cam rail 187, the connecting rod 182 is moved outwardly to tilt the actuating lever 162 forwardly on the shaft 93 and effect cooperation between the backing tool 111 and flaring tool 140 in a manner that will now appear as the operation of the machine is set forth.

*Operation of the apparatus*

Figure 6:
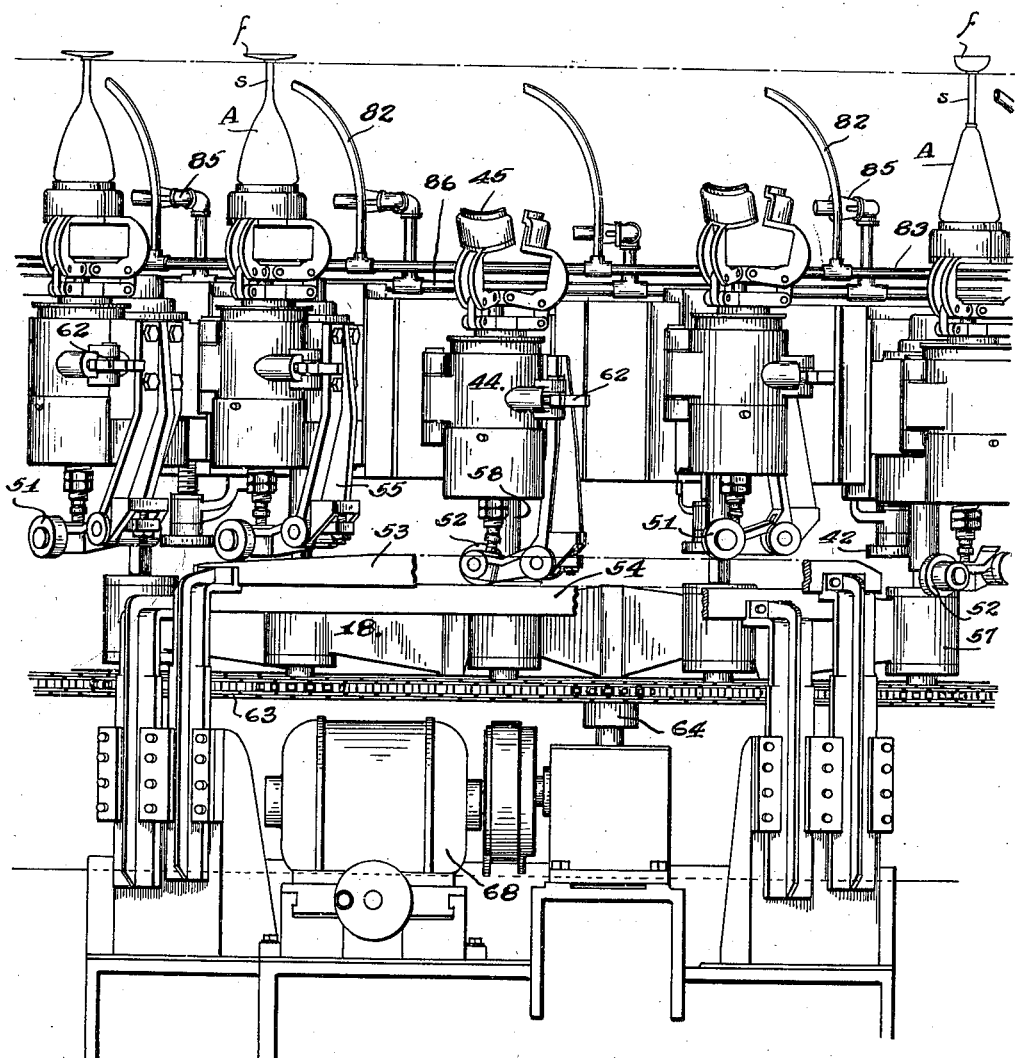
Fig. 6 is a fragmentary front elevational view of the lower portion of the machine in the region of the takeout zone.

The stemware is introduced into the rotating machine at the loading zone $Z^1$, the chuck jaws 45 closing upon the articles in the manner previously set forth to retain the same in an inverted position with the foot portions uppermost as illustrated in Fig. 6. As the machine rotates the articles are brought to the reheating zone $Z^2$ successively and the foot portions $f$ thereof are raised to a temperature which is sufficiently high to soften the glass thereof in order that the force of gravity may partially flatten out these portions and cause the same to assume a more or less irregular or uneven flat disk-like form (Fig. 8) preparatory to the reshaping operation.

Upon continued rotation of the machine and as the articles approach the reshaping zone, the slides 103 (Fig. 2), the movement of which is controlled by means of the cam rollers 104 operating in the cam groove 105, move radially outward to swing the foot-forming units 23 outwardly to their operative positions.

Each adjusting screw or limit stop 133 (Fig. 7) is previously adjusted so that when one side of the arm 95 comes into contact therewith the forward edge of the backing tool (Fig. 8) will engage the stem $s$ of the article at the base thereof with no appreciable degree of pressure and with the tapered foot-engaging surface 130 thereof underlying and in engagement with the obtuse face of the foot portion $f$. In this position the semi-circular recess 131 at the forward edge of the backing tool straddles the base of the stem $s$ as shown in Fig. 11.

After the backing tool 111 is thus brought into operative engagement with the foot portion $f$ of the article, the actuating lever 162 (Fig. 9), the movement of which is controlled by the connecting rod 182 and cam roller 186 (Fig. 2) that bears against the cam rail 187, is tilted forwardly and downwardly from the dotted line position to the full line position shown in Fig. 9. As a consequence, the pivoted foot-piece 149 is tilted forwardly and downwardly from the position it occupies in Fig. 8 to the position it occupies in Fig. 9 by means of the link assembly 135.

During tilting of the foot-piece 149, the two-part unit consisting of the flaring tool holder 141 and the bracket 145 to which the holder is securely clamped, is lowered without changing its position relative to the foot-piece 149 until such time as the small protuberance 143 at the forward edge of the flaring tool 140 engages and seats in the hollow or depression ordinarily occurring at the center of the foot portion $f$. During the remainder of the reshaping operation the protuberance 143 serves to center the foot portion f and prevent shifting of the same laterally, thus materially reducing any tendency for the stem s to become broken. This protuberance then becomes a pivot point for the entire flaring tool assembly including the tool 140, its holder 141 and the holder bracket 145, and continued tilting of the actuating lever 162 causes the yieldable link assemblies 135 and 170 to become compressed, thus further tilting the foot-piece 149 and causing the flaring tool holder assembly to move from the position it occupies in Fig. 8 to the position it occupies in Fig. 9 relative to the foot-piece 149. It is to be noted that the forward lower edge of the flaring tool 140 which first engages the foot portion f of the article occupies a position of exact coincidence with the pivotal axis between the holder bracket 145 and foot-piece 149. Thus the final tilting movement of the flaring tool 140 relative to the backing tool 111 is made possible and the rotating foot portion of the article is ironed, so to speak, from the center thereof outwardly and is caused to assume an even symmetrical form, all mold marks and other unevenness being eradicated in the process.

After the flaring operation is completed the flaring tool 140 is elevated from the backing tool 111, the latter rising slightly to finally position and marver the upper surface of the foot, the entire reshaping unit 23 being then restored to its inoperative position as shown in Fig. 2. As the machine continues to rotate, the articles are brought to the loading zone Z¹ where the chuck jaws 45 become opened to permit removal of the articles from the machine. The operation of the machine is continuous.

Modifications may be resorted to within the spirit and scope of the appended claims.

We claim:

1. In a machine for flaring glass articles, a support, an arm pivoted to and depending from the support, a backing tool holder mounted on the lower end of the arm, a backing tool mounted on the holder, means for swinging the arm from an inoperative position to an operative position wherein the backing tool engages an article to be flared, a foot pivoted at one end to the arm above the level of the backing tool holder and projecting outwardly therefrom, an actuating lever pivoted to the support, a compressible link pivoted to the foot and to the actuating lever in the medial regions of the same respectively, a flaring tool holder pivoted at one end to the outer end of the foot, a flaring tool mounted on the latter holder, a compressible link pivoted to the other end of the flaring tool holder and to the outer end of the actuating lever respectively, and means for tilting the actuating lever.

2. In combination, a tool for flattening semi-plastic glass articles, comprising a pressed carbon block having a pair of longitudinal grooves formed on opposite sides thereof, a holder for said tool having a flat upper surface on which the tool is supported, a flange on said holder extending upwardly at one side of said surface alongside the tool, said flange having an inwardly directed rib projecting into one of the grooves in the tool, a tiltable member pivoted to the holder and extending upwardly at the other side of the surface alongside the tool, said member having an inwardly directed rib projecting into the other groove in the tool, and spring means normally urging said member inwardly of the holder toward said flange.

3. In a machine for flaring glass articles, a support, an arm pivoted to and depending from the support, a backing tool holder mounted on the lower end of the arm, a backing tool mounted on the holder, means for swinging the arm from an inoperative position to an operative position wherein the backing tool engages an article to be flared, a foot pivoted at one end to the arm above the level of the backing tool holder and projecting outwardly therefrom, an actuating lever pivoted to the support, a compressible link pivoted to the foot and to the actuating lever in the medial regions of the same respectively, a flaring tool holder pivoted at one end to the outer end of the foot, a flaring tool mounted on the latter holder, a bracket rigidly secured to the latter holder and pivoted to the outer end of the foot, means for adjusting the inclination of the flaring tool holder relative to the bracket, a compressible link pivoted to the flaring tool holder and to the outer end of the actuating lever respectively, and means for tilting the actuating lever.

4. In a machine for flaring glass articles, a support, an arm pivoted to and depending from the support, a backing tool holder pivoted to the lower end of the arm and projecting outwardly at an angle therefrom, means for adjusting the inclination of the holder relative to the arm, a backing tool mounted on the holder, means for swinging the arm from an inoperative position to an operative position wherein the backing tool engages an article to be flared, a foot pivoted at one end to the arm above the level of the backing tool holder and overlying the latter, a flaring tool holder pivoted to the outer end of the foot, a flaring tool mounted on the latter holder, means yieldingly maintaining the flaring tool holder and tool carried thereby inclined with respect to the foot, and means for tilting the foot about its axis of pivotal movement on the arm whereby the flaring tool is moved toward the backing tool and engages the article and thereafter is tilted against the action of said yielding means.

5. In a machine for flaring glass articles, a support, an arm pivoted to and depending from the support, a backing tool holder pivoted to the lower end of the arm and projecting outwardly at an angle therefrom, means for adjusting the inclination of the holder relative to the arm, a backing tool mounted on the holder, means for swinging the arm from an inoperative position to an operative position wherein the backing tool engages an article to be flared, a foot pivoted at one end to the arm above the level of the backing tool holder and overlying the latter, a flaring tool holder pivoted to the outer end of the foot, a flaring tool mounted on the latter holder, means yieldingly maintaining the flaring tool holder and tool carried thereby inclined with respect to the foot, means for adjusting the normal inclination of the flaring tool holder relative to the foot, and means for tilting the foot about its axis of pivotal movement on the arm whereby the flaring tool is moved toward the backing tool and engages the article and thereafter is tilted against the action of said yielding means.

HAROLD R. SCHUTZ.
CHARLES R. VINING.